US006314297B1

(12) United States Patent
Karl

(10) Patent No.: US 6,314,297 B1
(45) Date of Patent: Nov. 6, 2001

(54) COMMUNICATION SYSTEM

(75) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/462,593

(22) PCT Filed: Mar. 18, 1998

(86) PCT No.: PCT/DE98/00794

§ 371 Date: Jan. 10, 2000

§ 102(e) Date: Jan. 10, 2000

(87) PCT Pub. No.: WO99/08470

PCT Pub. Date: Feb. 18, 1999

(30) Foreign Application Priority Data

Aug. 8, 1997 (DE) .............................................. 197 34 312

(51) Int. Cl.$^{7}$ ....................................................... H04Q 7/20

(52) U.S. Cl. .......................... 455/456; 455/352; 455/353; 455/151.2; 455/151.4; 455/420; 340/825.49; 340/825.69

(58) Field of Search .................................... 455/456, 352, 455/353, 151.1, 151.2, 151.4, 420; 340/825.49, 825.36, 825.69, 825.72

(56) References Cited

U.S. PATENT DOCUMENTS 3,739,329 * 6/1973 Lester ................................ 340/16 R
5,406,274 * 6/1995 Lambropoulos et al. ...... 340/825.69
5,479,408 * 12/1995 Will .................................... 370/94.1
5,493,692 * 2/1996 Theimer et al. .................... 455/26.1
5,657,010 * 8/1997 Jones ................................... 340/994
5,825,283 * 10/1998 Camhi ................................. 340/438
5,889,488 * 3/1999 Kosaki .................................. 342/17
5,905,442 * 5/1999 Mosebrook et al. ............ 340/825.06
6,005,486 * 12/1999 Fridley et al. .................. 340/825.22
6,157,845 * 12/2000 Henry et al. ......................... 455/553

* cited by examiner

*Primary Examiner*—William Trost
*Assistant Examiner*—Marceau Milord
(74) *Attorney, Agent, or Firm*—Michael J. Striker

(57) ABSTRACT

The invention relates to a communication system, having at least one mobile communication device which has at least one actuating means for tripping an action of at least one piece of equipment communicating with the communication device.

It is provided that within a usage area (10) of the at least one communication device (12), defined regions (16, 18, 20, 22, 24) are assigned position marks (36, 38, 40, 42, 44), which when the communication device (12) enters one of the defined regions (16, 18, 20, 22, 24) of the communication device (12) impart the current position for switching over a function setting of the at least one actuating means (50).

9 Claims, 1 Drawing Sheet

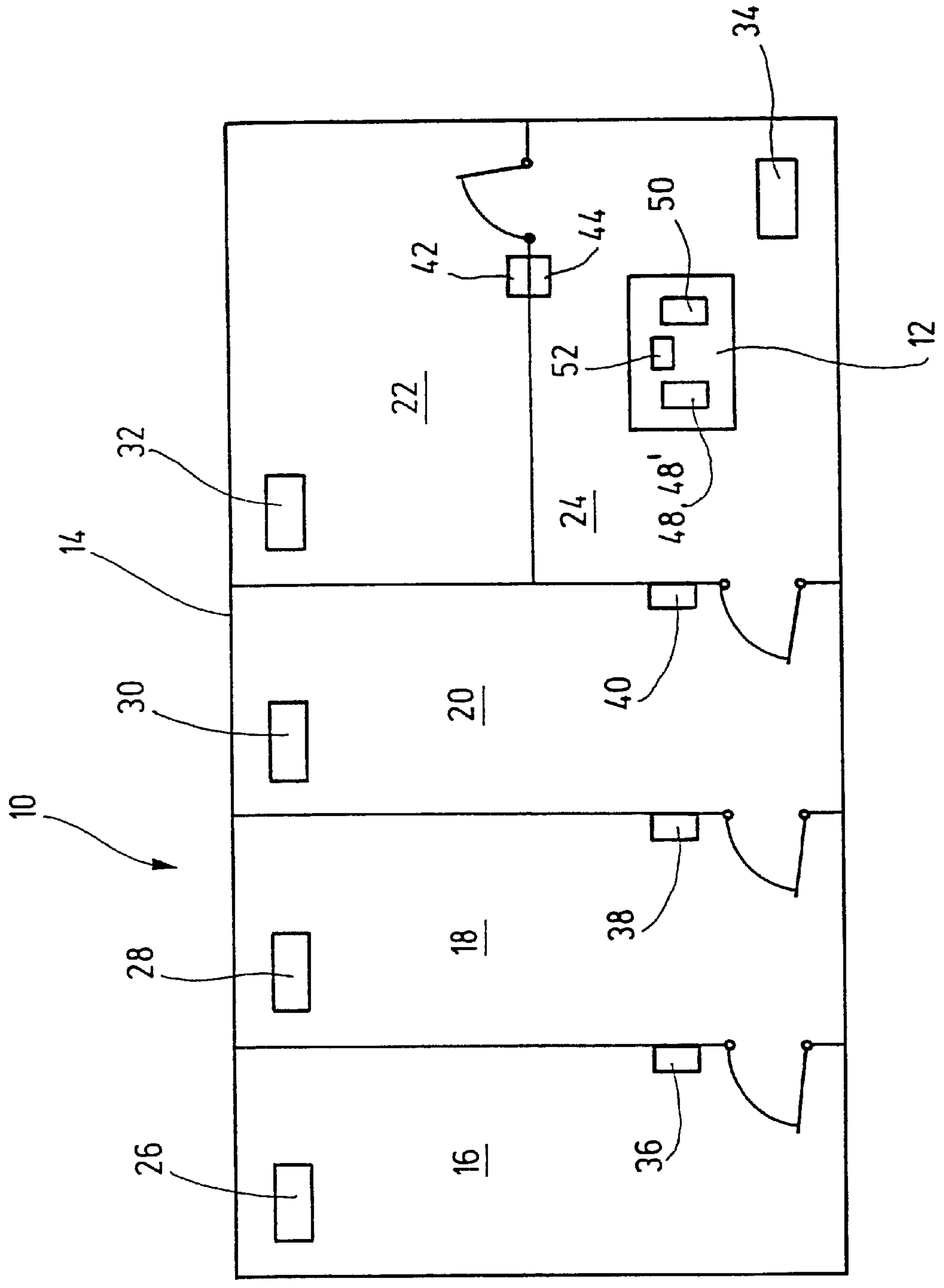
Fig.

COMMUNICATION SYSTEM

BACKGROUND OF THE INVENTION

The invention relates to a communication system having at least one mobile communication device.

Communication systems of this generic type that can move their location are known. They have at least one mobile communication device, by means of which an action of further devices communicating with the communication device can be tripped. For instance via a remote controller of the communication device, various pieces of equipment and/or devices can be actuated within a usage area. Typical usage areas are for instance a building with multiple spaces, where different pieces of equipment can be actuated inside the spaces by means of the communication device. Since when remote controllers are used the radio waves have the property of penetrating both the boundary walls of the individual spaces and objects, the communication device necessarily has to be designed in such a way as to enable operating only one particular piece of equipment, without tripping other devices in other spaces that are also actuatable with the communication device. To that end, it is known to provide the communication device with a corresponding number of actuating means, so that each possible control function within the operational range can be executed separately, or so that some control functions can be projected onto a combination of actuating means, or a chronological succession of actuating means.

SUMMARY OF THE INVENTION

The communication system of the invention that can be moved from place to place, offers the advantage that in a simple way, a spatially dependent multiple use of actuating means of the communication device is possible. Because within one usage area of the at least one communication device, position marks are assigned to defined regions which position marks, upon entry of the communication device into the defined region of the communication device impart the actual position, an automatic switchover of the communication device, and in particular the setting of the at least one actuating means, can be switched over to tripping of an action of a device located in the current defined region. Thus by means of one actuating means, many different devices can be actuated; this substantially improves the ease of use of the communication device.

In a preferred feature of the invention, the position marks generate electromagnetic waves, which are received by the piece of communication equipment; position marks belonging to one usage area broadcast different electromagnetic waves per defined region, so that an unambiguous association with a defined region is possible. By way of the electromagnetic waves received from the communication device, an association with the defined region can be made, and internally in the communication device a switchover of the setting of the actuating means can be done.

In a further preferred feature of the invention, it is provided that the position marks are activatable by the communication device. As a result, it is highly advantageously attained that the position marks issue a position signal to the communication device only whenever the communication device enters the defined region associated with the active position marks. Thus all the position marks within the usage area are in readiness and are activated only whenever the communication device enters their region.

BRIEF DESCRIPTION OF THE DRAWINGS

The invention will be described in further detail below in an exemplary embodiment in conjunction with the associated drawing, which schematically shows a usage area of a communication device.

DESCRIPTION OF THE PREFERRED EMBODIMENTS

In the drawing, a usage area marked 10 of a communication device 12 is shown. The usage area 10 for instance includes a building or part of a building 14 with individual spaces 16, 18, 20, 22, and 24. A communication space need not be identical with the dividing up of the building into rooms. For instance, one communication space can encompass several rooms. Naturally any other constellation of the usage area 10 is also conceivable. In the exemplary embodiment, it is assumed that a communication device 12 is assigned to the usage area 10. Naturally entirely analogously, a plurality of communication devices 12 can also be assigned to the usage area 10.

In each of the spaces 16 through 24, at least one piece of equipment 26, 28, 30, 32, and 34 is installed that is actuatable by means of the communication device 12. To that end, the communication device 12 for instance has a radio transmitter while the pieces of equipment 26 through 24 have a corresponding radio receiver. The pieces of equipment 26 through 24 can for instance be drive mechanisms for rolling window shutters, remote-controllable pieces of consumer electronics equipment, video cameras, or any other arbitrary piece of equipment that is actuatable by means of a remote controller.

The spaces 16 through 24 form defined regions of the usage area 10. Each of the spaces 16 through 24 is assigned one position mark 36, 38, 40, 42, and 44, respectively.

The position marks 36 through 44 have an energy source or are connected to an energy source, and they include devices for generating electromagnetic signals. The electromagnetic signals can be produced for instance by triggering a coil with a supply voltage of defined frequency. The position marks 36 through 44 are designed such that each of the position marks 36 through 44 broadcasts different electromagnetic signals, and in particular electromagnetic signals of different frequency.

The communication device 12 has a receiver 48 for the electromagnetic signals broadcast by the position marks 36 through 44. The position marks 36 through 44 are designed such that the broadcast electromagnetic signals can be received only within a narrowly defined spatial range of the receiving unit 48. In particular, the position marks 36 through 44 are designed such that reception of the electromagnetic signals is possible only when moving directly past the position marks 36 through 44. For example, the position marks 36 through 44 can be disposed in the region of access doors to the spaces 16 through 24, so that when a person possessing the communication device 12 moves past the applicable door, the receiving unit 48 receives the electromagnetic signals transmitted by the position mark 36 through 34 that has just been passed. By means of the electromagnetic signals received, an actuating means 50 of the communication device 12 is varied in terms of a function setting.

The function setting of the actuating means 50 is designed such that when one of the spaces 16 through 24 is entered, the piece of equipment 26 through 34 located in this space can be actuated. For instance, if the communication device 12 is moved into the room 20, then the receiving unit 48 receives a signal from the position mark 40 that adjusts the setting of the actuating means 50 to control of the piece of equipment 30. If the communication device 12 then moves on into the space 18, the receiving unit 48 receives the electromagnetic signals of the position mark 38, as a result of which the functional setting of the actuating means 50 is switched over to actuating the piece of equipment 28.

Thus in summary, in a simple way by means of only a single actuating means 50, it is possible to actuate the most various pieces of equipment 26 through 34; because of the switchover of the function setting, only whichever is the current piece of equipment, that is, the piece of equipment 26 through 34, in whose defined region (spaces 16 through 24) the communication device 12 is located at the moment, can be actuated. It is understood that the communication device 12 may have additional actuating means which for instance accomplish an actuation of all the pieces of equipment 26 through 34, regardless of whatever is the current position of the communication device 12, or that are used for actuating other pieces of equipment.

The receiving unit 48 can for instance be embodied as a transceiver unit 48', so that communication is possible with the position marks 36 through 44, which have a corresponding receiving device. The thus-cooperating position marks 36 through 44 and the transceiver 48' serve to detect any motion of the communication device 12, so that all the position marks 36 through 44 are in a resting phase, and only the position mark 36 through 44 in whose region the communication device 12 is located at that precise time, or the communication device 12 just now entering its region, is actuated. This offers the advantage of reducing energy consumption by the entire communication system that is movable from place to place to the bare minimum necessary.

To enable detection of the motion of the communication device 12, the communication device can for instance have a device 52 that trips a signal accordingly when the communication device 12 is in motion. The device 52 can be formed for instance by a ball located in a cage and made of an electrically conductive material; by motion of the communication device 12, this ball short-circuits contacts disposed, electrically insulated from one another, inside the cage. By means of this kind of short circuit, the transceiver 48 that thereupon responds to the current position mark 36 through 34 at that precise time can be activated.

The electromagnetic signals broadcast by the position marks can for instance be low-frequency signals, or signals located in the frequency range of radio signals of the communication device, or high-frequency signals. By means of the low-frequency signals and the electromagnetic signals located in the frequency range of the communication device 12, it is possible, highly advantageously, because of their spatially limited nature, to tune the actuating means 50 exactly to the precise current defined region (spaces 16 through 24). By means of the high-frequency signals, which have a relatively limited range, are preferably suitable for triggering the communication device 12, because in this way electromagnetic signals of more than one position mark 36 through 44 are prevented from being superimposed on one another.

What is claimed is:

1. A communication system, having at least one mobile communication device which has at least one actuating means for tripping an action of at least one piece of equipment communicating with the communication device, wherein within a usage area (10) of the at least one communication device (12), usage are (10) of the at least one communication device (12), defined regions (16, 18, 20, 22, 24) are assigned position marks (36, 38, 40, 42, 44), which when the communication device (12) enters one of the defined regions (16, 18, 20, 22, 24) of the communication device (12) impart the current position for switching over a function setting of the at least one actuating means (50), and wherein the position marks (36, 38, 40, 42, 44) transmit electromagnetic signals that can be received by the communication device (12), and the communication device (12) has a receiving unit (48) for receiving the electromagnetic signals, which as a function of the reception of the electromagnetic signals of one of the position marks (36, 38, 40, 42, 44) trips the switch over of the function setting of the actuating means (50), characterized in that the communication device (12) includes a device (52) by means of which a motion of the communication device (12) is detectable, and which triggers a transmitting device (48') of the communication device (12) to activate at least one of the position marks (36, 38, 40, 42, 44), so that the activation of the position marks (36, 38, 40, 42, 44) is effected only if the communication device (12) is in motion, and a piece of equipment located in a region when the communication device is situated, is activated.

2. The communication system of claim 1, characterized in that the position marks (36, 38, 40, 42, 44) transmit electromagnetic signals that can be received by the communication device (12).

3. The communication system of claim 1, characterized in that the position marks (36, 38, 40, 42, 44) transmit different electromagnetic signals, in particular electromagnetic signals of different frequency.

4. The communication system of claim 1, characterized in that the communication device (12) has a receiving unit (48) for receiving the electromagnetic signals, which as a function of the reception of the electromagnetic signals of one of the position marks (36, 38, 40, 42, 44) trips the switchover of the function setting of the actuating means (50).

5. The communication system of claim 1, characterized in that the position marks (36, 38, 40, 42, 44) are disposed near the access to the regions (16, 18, 20, 22, 24).

6. The communication system of claim 1, characterized in that the position marks (36, 38, 40, 42, 44) are activatable by the communication device (12).

7. The communication system of claim 6, characterized in that the activation of the position marks (36, 38, 40, 42, 44) is effected only if the communication device (12) is in motion.

8. The communication system of claim 1, characterized in that the communication device (12) includes a device (52) by means of which a motion of the communication device (12) is detectable, and which triggers a transmitting device (48') of the communication device (12) to activate at least one of the position marks (36, 38, 40, 42, 44).

9. The communication system of claim 1, characterized in that the electromagnetic signals broadcast by the position marks (36, 38, 40, 42, 44) are low-frequency signals, or signals located in the frequency range of radio signals of the communication device (12), or high-frequency signals.

* * * * *